(12) United States Patent
Park (10) Patent No.: US 10,038,220 B2
(45) Date of Patent: Jul. 31, 2018

(54) NONAQUEOUS ELECTROLYTE FOR LITHIUM BATTERY SAFETY

(71) Applicant: Greatbatch Ltd., Clarence, NY (US)

(72) Inventor: Chi-Kyun Park, San Jose, CA (US)

(73) Assignee: Greatbatch Ltd., Clarence, NY (US)

( * ) Notice: Subject to any disclaimer, the term of this patent is extended or adjusted under 35 U.S.C. 154(b) by 357 days.

(21) Appl. No.: 14/983,650

(22) Filed: Dec. 30, 2015

(65) Prior Publication Data

US 2017/0194668 A1     Jul. 6, 2017

(51) Int. Cl.
*H01M 10/0567* (2010.01)
*H01M 10/42* (2006.01)
*H01M 10/0569* (2010.01)
*H01M 10/0568* (2010.01)
*H01M 10/0525* (2010.01)

(52) U.S. Cl.
CPC ... *H01M 10/4235* (2013.01); *H01M 10/0525* (2013.01); *H01M 10/0567* (2013.01); *H01M 10/0568* (2013.01); *H01M 10/0569* (2013.01); *H01M 2300/0025* (2013.01); *H01M 2300/0037* (2013.01)

(58) Field of Classification Search
CPC ......... H01M 10/0567; H01M 10/0568; H01M 10/0569; H01M 10/4235; H01M 10/0525; H01M 2300/0037; H01M 2300/0025
See application file for complete search history.

(56) References Cited

U.S. PATENT DOCUMENTS

| | | | |
|---|---|---|---|
| 5,114,811 A | 5/1992 | Ebel et al. | |
| 6,593,029 B2 | 7/2003 | Spillman et al. | |
| 7,026,791 B2 | 4/2006 | Palazzo et al. | |
| 7,128,998 B2 | 10/2006 | Shimoyamada et al. | |
| 7,687,204 B2 | 3/2010 | Kang et al. | |
| 7,799,470 B2 | 9/2010 | Cho et al. | |
| 2003/0165733 A1 | 9/2003 | Takehara et al. | |
| 2004/0101762 A1 | 5/2004 | Noh et al. | |
| 2005/0026043 A1 | 2/2005 | Kang et al. | |
| 2005/0042519 A1* | 2/2005 | Roh ................. | H01M 10/0567 429/330 |
| 2007/0037063 A1* | 2/2007 | Choi ................. | H01M 10/0567 429/200 |
| 2008/0044729 A1 | 2/2008 | Gilmour et al. | |
| 2009/0136846 A1* | 5/2009 | Lee ................. | H01M 4/1395 429/217 |

* cited by examiner

*Primary Examiner* — Laura Weiner
(74) *Attorney, Agent, or Firm* — Michael F. Scalise (57) ABSTRACT

A lithium ion electrochemical cell having an electrolyte with reduced carbonate content is described. The reduced carbonate electrolyte minimizes electrolyte out-gassing when the cell is exposed to temperatures above 100° C. The preferred electrolyte comprises a primary solvent of γ-butyrolactone and a secondary solvent comprising an aliphatic or halogen constituent. A most preferred electrolyte consists essentially of γ-butyrolactone as a primary solvent, fluorotoluene as a secondary solvent, and an electrolyte additive formulation of vinylene carbonate, fluorinated ethylene carbonate, and polyvinyl pyridine-co-styrene. An alkali metal salt is added to the solvent admixture.

27 Claims, 6 Drawing Sheets

NONAQUEOUS ELECTROLYTE FOR LITHIUM BATTERY SAFETY

FIELD OF THE INVENTION

The present invention generally relates to an alkali metal electrochemical cell, and more particularly, to a rechargeable alkali metal cell. Still more particularly, the present invention relates to a lithium ion electrochemical cell activated with an electrolyte that minimizes the evolution of gas formed within the sealed cell casing at elevated temperatures.

BACKGROUND OF INVENTION

Alkali metal rechargeable cells typically comprise a carbonaceous anode electrode, a lithiated cathode electrode, and an electrolyte s that are hermetically sealed within a case or housing. These alkali metal rechargeable electrochemical cells are generally used to power implantable medical devices such as pacemakers, neurostimulators, cardioverter defibrillators, left ventricular assist devices, artificial hearts, and the like. As such, hermetically sealed alkali metal rechargeable electrochemical cells generally do not comprise a venting mechanism to relieve over-pressure in the event of unexpected gas formation within the cell. Incorporation of a venting mechanism within the cell may compromise the hermetic seal and, therefore, may result in the malfunction of the electrochemical cell. Thus, the hermetic seal not only prevents fluids from entering the cell, but additionally prevents out-gassing of the cell, should gas form within the cell. As a result, continued gas formation within the hermetically sealed cell could expand the casing and eventually cause the cell to burst.

Conventional electrolyte formulations utilized for alkali metal rechargeable cells generally comprise solvents having carbonate constituents. These carbonate containing solvents are known to evolve gas when exposed to elevated temperatures, particularly temperatures greater than 100° C. The cell could be exposed to such elevated temperatures in the unlikely event that an electrical short were to occur within the cell. In this extreme condition, localized heat may increase within the cell to temperatures great enough such that gas may evolve from conventional carbonate based electrolytes. Evolution of gas might cause the cell to physically expand and potentially burst.

The present invention, therefore, addresses the possibility of gas formation within the cell caused by exposure to extreme heat. The present invention provides an alkali metal rechargeable electrochemical cell having a binary non-aqueous electrolyte that minimizes gas evolution at elevated temperatures. Specifically, the present invention provides a metal alkali rechargeable electrochemical cell having a non-aqueous electrolyte comprising a primary solvent of γ-butyrolactone and a second solvent comprising an aliphatic or halogen substituted aromatic constituent that reduces gas evolution when exposed to extreme temperatures.

SUMMARY OF THE INVENTION

It is commonly known that a lithium metal alkali rechargeable battery operates by the back and forth movement of lithium ions between a negative or anode electrode and a cathode or positive electrode. During discharge of the cell, lithium ions generally flow from the negative electrode through a separator, to the positive electrode. During a recharge cycle, the lithium ions flow in the opposite direction, from the positive electrode through the separator, to the negative electrode. This process of cyclically discharging and recharging the cell creates a flow of lithium ions, which, under normal operating conditions, proceeds in a controlled manner.

However, in the unlikely event that an electrical short or other malfunction was to develop within the cell, localized excessive heating due to the uncontrolled flow of lithium ions may occur. This excessive heat could increase temperatures within the cell such that carbonate based electrolyte solvents of the prior art, such as ethylene carbonate (EC), ethyl methyl carbonate (EMC), dimethyl carbonate (DMC), diethyl carbonate (DEC) and combinations thereof could out-gas. Such out-gassing, could therefore, expand the casing such that it may burst.

The electrochemical cell of the present invention utilizes non-aqueous electrolyte chemicals having a reduced carbonate content that minimizes electrolyte out-gassing and, therefore, minimizes the possibility of a rupture of the cell when exposed to extreme temperatures. The rechargeable electrochemical cell of the present invention utilizes an electrolyte formulation having a binary non-aqueous solvent system comprising a primary solvent of γ-butyrolactone (GBL) and a secondary solvent comprising an aliphatic or halogen substituted constituent. In addition, a salt, as well as other electrolyte additives may be added to the electrolyte to enhance the electrical performance properties of the electrochemical cell. A most preferred electrolyte consists essentially of γ-butyrolactone as a primary solvent, fluorotoluene as a secondary solvent, and an electrolyte additive formulation of vinylene carbonate (VC), fluorinated ethylene carbonate (FEC), and polyvinyl pyridine-co-styrene (PVPS). An alkali metal salt is added to the solvent admixture.

The primary non-aqueous electrolyte solvent provides an electrolyte constituent that enables operation of the rechargeable electrochemical cell while reducing the possibility of out-gassing when exposed to extreme temperatures greater than 100° C., particularly greater than 150° C. Specifically, the primary solvent facilitates transfer of lithium ions between the negative and positive electrodes while minimizing out-gassing of the solvent at elevated temperatures. The secondary solvent is included to enhance the wetting of the electrolyte to the surface of the separator. The salt and other additives are designed to increase the electrical performance and charge capacity characteristics of the cell.

As will be shown, the non-aqueous primary and secondary solvent formulation of the electrolyte of the present invention significantly reduces the possibility of out-gassing when exposed to abnormally extreme temperatures. In addition, the electrolyte formulation of the present invention enables the rechargeable electrochemical cell to achieve an electrical performance that is comparable to prior rechargeable lithium ion cells comprising carbonate-based electrolytes. Hence, the composition of the present electrolyte significantly reduces the possibility of out-gassing while maintaining desirable electrical performance characteristics of rechargeable cells.

DETAILED DESCRIPTION OF THE PREFERRED EMBODIMENTS

Figure 1:
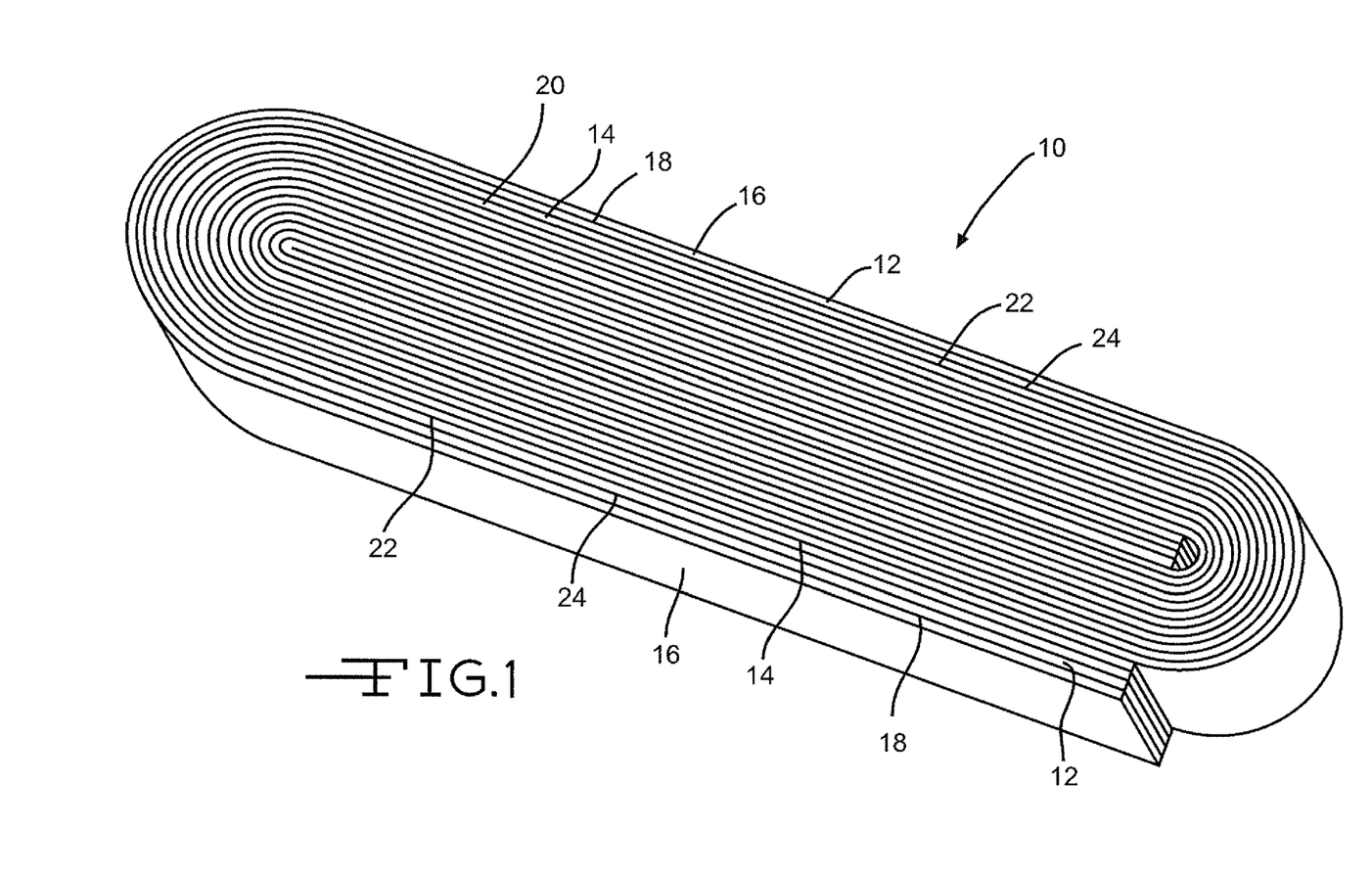
FIG. 1 is a cross-sectional view of an embodiment of an electrode assembly of the electrochemical cell of the present invention.

Now turning to the figures, FIG. 1 illustrates an embodiment of an electrode assembly 10 of a secondary electrochemical cell of the present invention. As shown, the cell comprises an anode or negative electrode 12 separated from a cathode or positive electrode 14 by a separator 24. In secondary electrochemical systems, the anode 12 comprises an anode or negative electrode active material 16 capable of intercalating and de-intercalating an alkali metal, preferably lithium, that is generally supplied from the cathode 14.

In a preferred embodiment, the negative electrode active material 16 comprises a carbonaceous material. Various forms of carbon (e.g., coke, graphite, acetylene black, carbon black, glassy carbon, etc.), which are capable of reversibly retaining the lithium species, are preferred. Graphite is particularly preferred due to its relatively high lithium-retention capacity. Regardless the form of carbon, fibers of the carbonaceous material is particularly advantageous. That is because fibers have excellent mechanical properties that permit them to be fabricated into rigid electrodes capable of withstanding degradation during repeated charge/discharge cycling. Moreover, the high surface area of carbon fibers allows for rapid charge/discharge rates. A preferred carbonaceous material for the anode 12 of a secondary electrochemical cell is described in U.S. Pat. No. 5,443,928 to Takeuchi et al., which is assigned to the assignee of the present invention and incorporated herein by reference.

Alternatively, the anode active material 16 may comprise a metal or metal oxide wherein the metal is capable of forming an alloy with an alkali metal at a voltage below 2.0V versus lithium. Exemplary anode active materials 16 may include silicon, tin, aluminum, zinc, silver, and oxides thereof. Preferably the active anode material 16 is a metal oxide capable of intercalating alkali metal ions such as $Li_4Ti_5O_{12}$ and other lithium titanium oxides. The anode active material 16, however, is not limited to these specific examples and may comprise any material capable of intercalating and deintercalating alkali metals at a voltage below about 2.0V versus lithium. In a preferred embodiment, the anode active material 16 may be in a powder form having an average particle size ranging from about 100 nm to about 100 µm.

A typical secondary cell anode 12 is fabricated by mixing about 90 to 97 wt. % of the active material 16 with about 3 to 10 wt. % of a binder material which is preferably a fluoro-resin powder such as polytetrafluoroethylene (PTFE), polyvinylidine fluoride (PVDF), polyethylenetetrafluoroethylene (ETFE), polyamides and polyimides, and mixtures thereof. This electrode active admixture is provided on an anode current collector 18 such as of a nickel, titanium, stainless steel, or copper foil or screen by casting, pressing, rolling or otherwise contacting the active admixture thereto.

The anode 12 may further have an extended tab or lead of the same material as the anode current collector 18, i.e., preferably nickel, integrally formed therewith such as by welding and contacted by a weld to a cell case (not shown) of conductive metal in a case-negative electrical configuration. Alternatively, the carbonaceous anode 12 may be formed in some other geometry, such as a bobbin shape, cylinder or pellet to allow an alternate low surface cell design. In either case, after the anode active material slurry is coated onto the anode current collector 18, the anode active material slurry is pressed to a coating density of between about 1.25 grams per cubic centimeter (g/cc) to about 1.70 grams per cubic centimeter (g/cc).

In a preferred embodiment, as shown in FIG. 1, the cathode 14 includes a cathode or positive electrode active material 20 selected from Groups IA, IIA, or IIIB of the Periodic Table of Elements, including the alkali metals lithium, sodium, potassium, etc. The preferred cathode active material 20 comprises lithium. More specifically, the cathode active material 20 comprises an ionic species of a material selected from Groups IA, IIA, or IIIB of the Periodic Table of Elements.

The active lithiated material 20 of the cathode 14 preferably is stable in air and readily handled. More specifically, the active cathode material 20 comprises a layered metal oxide having the general formula, $LiMO_2$ where M is one or more metals selected from columns 4 through 13 of the Periodic Table of Elements. Examples of such air-stable lithiated cathode materials 20 include oxides, sulfides, selenides, and tellurides of such metals as vanadium, titanium, chromium, copper, molybdenum, niobium, iron, nickel, cobalt and manganese. Additionally, the active cathode material 20 may have a spinel structure comprising the general formula $LiM_2O_4$ where M is one or more elements from columns 4 through 13 of The Periodic Table of Elements. Furthermore, the active cathode material 20 may comprise an olivine or NASICON type structure having the general formula $LiMPO_4$ where M is an element selected from columns 4 through 13 of the Period Table of Elements. Specific preferred oxides include $LiNiO_2$, $LiMn_2O_4$, $Li_4Ti_5O_{12}$, $LiCoO_2$, $LiCo_{0.92}Sn_{0.08}O_2$, $LiNi_xCo_yMn_2O_2$ (preferably $LiNi_6CO_2Mn_2O_2$), lithium nickel cobalt aluminum oxide ($LiNi_{(1-x-y)}Co_xAl_yO_2$) and lithium cobalt nickel oxide ($LiCo_{1-x}Ni_xO_2$).

The lithiated active material 20 is preferably mixed with a conductive additive selected from acetylene black, carbon black, graphite, and powdered metals of nickel, aluminum, titanium and stainless steel. The cathode electrode 14 further comprises a fluoro-resin binder, preferably in a powder form, such as PTFE, PVDF, ETFE, polyamides and polyimides, and mixtures thereof. The lithiated active material mixture is then applied to a cathode current collector 22. Both the anode current collector 18 and the cathode current collector 22 may be composed of stainless steel, titanium, tantalum, platinum, gold, aluminum, cobalt nickel alloys, highly alloyed ferritic stainless steel containing molybdenum and chromium, and nickel-, chromium- and molybdenum-containing alloys.

To recharge such secondary cells, lithium ions from the cathode 14 are intercalated into the anode 12 by applying an externally generated electrical potential to the cell. The applied recharging potential serves to draw lithium ions from the cathode material 20, through the electrolyte and into the carbonaceous anode 12 to saturate the carbon comprising the anode 14. The resulting $Li_xC_6$ electrode can have an x ranging between 0.1 and 1.0. The cell is then provided with an electrical potential and discharged in a normal manner.

An alternate secondary cell construction comprises intercalating the carbonaceous material 16 with the active alkali material before the anode 12 is incorporated into the cell. In this case, the cathode body 14 can be solid and comprise, but not be limited to, such materials as manganese dioxide, silver vanadium oxide, copper silver vanadium oxide, titanium disulfide, copper oxide, copper sulfide, iron sulfide, iron disulfide and fluorinated carbon. However, this approach is compromised by problems associated with handling lithiated carbon outside of the cell. Lithiated carbon tends to react when contacted by air.

The secondary cell of the present invention includes a separator 24 to provide physical segregation between the anode and cathode active electrodes 12, 14. The separator 24 is of an electrically insulative material to prevent an internal electrical short circuit between the electrodes 12, 14. In addition, the separator material is also chemically unreactive with the anode and cathode active materials 16, 20 and both chemically unreactive with and insoluble in the electrolyte. Furthermore, the separator material has a degree of porosity sufficient to allow flow therethrough of the electrolyte during the electrochemical reaction of the cell. The form of the separator 24 typically is a sheet that is placed between the anode 12 and cathode 14 electrodes. Such is the case when the anode 12 is folded in a serpentine-like structure with a plurality of cathode plates disposed intermediate the anode folds and received in a cell casing or when the electrode combination is rolled or otherwise formed into a cylindrical "jellyroll" configuration (FIG. 1). In a preferred embodiment, the separator material melts at a temperature above 100° C., particularly at about 130° C. Such a melting temperature of the separator 24, "shuts off" or prevents the flow of lithium ions therethrough, and therefore, minimizes the possibility of an uncontrolled chemical reaction within the cell.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetraflouroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention preferably comprises a non-aqueous low carbon content binary solvent electrolyte formulation. In a preferred embodiment, the electrolyte comprises a primary solvent comprising γ-butyrolactone and a secondary solvent comprising an aliphatic or halogen substituted constituent. More specifically, the secondary solvent may comprise toluene, dichloro benzene (DCB), tetrachloro ethylene (TCE), fluorotoluene (FT), and combinations thereof. The chemical structure of the secondary solvent is preferably of a benzene ring structure, shown below, wherein $R_1$, $R_2$, $R_3$, $R_4$, $R_5$, and $R_6$ comprises hydrogen, fluorine, chlorine, bromine, iodine, astatine, or a C1-C3 alkyl molecule.

In an embodiment of the present invention, the primary solvent may comprise from about 70 wt. % to about 97 wt. %, and the secondary solvent may comprise from about 3 wt. % to about 30 wt. % of the binary electrolyte. In a preferred embodiment, the electrolyte comprises from about 70 wt. % to about 97 wt. % γ-butyrolactone (GBL) and from about 3 wt. % to about 30 wt. % fluorotoluene (FT). The addition of the secondary solvent to the electrolyte generally improves the wetting of the electrolyte to the surface of the separator 24, particularly those comprising polyethylene (PE) and polypropylene.

Table I shown below details the amount of gas evolved from various electrolyte solvents during a heating test. Specifically, Table I details the amount of gas evolved from various samples of non-aqueous solvents as they were heated to 400° C. at a rate of 10° C. per minute. Each of the solvent samples was weighed before and after exposure to the heating profile. The amount of weight loss was assumed to be the weight evolved into gas.

In Table I the carbonate based solvents of ethylene carbonate (EC), diethyl carbonate (DEC), dimethyl carbonate (DMC), propylene carbonate (PC), fluoroethylene carbonate (FEC), and a mixture of ethylene carbonate (EC), diethyl carbonate (DEC), dimethyl carbonate (DMC), and propylene carbonate (PC) evolved the most gas. That is in comparison to the non-carbonate containing solvents of phenyl acetate (PA), methyl benzoate (MB), and γ-butyrolactone (GBL). The average weight of gas evolved by the carbonate based solvents was about 40 wt. %. In comparison, the average weight of gas evolved by the non-carbonate containing solvents of phenyl acetate (PA), methyl benzoate (MB), and γ-butyrolactone (GBL) was about 6 wt. %. Therefore, an electrolyte comprising the non-aqueous solvents of phenyl acetate (PA), methyl benzoate (MB), and γ-butyrolactone (GBL) would most likely not expand the casing of the cell when exposed to extreme temperatures as compared to an electrolyte comprising the carbonate constituents detailed in Table I below.

TABLE I

| Solvent Type | Solvent | Gas Evolved (wt %) |
| --- | --- | --- |
| Carbonate | Ethylene carbonate (EC) | 59.7 |
| Carbonate | Diethyl carbonate (DEC) | 66.7 |
| Carbonate | Dimethyl carbonate (DMC) | 19.5 |
| Carbonate | Propylene carbonate (PC) | 32.7 |
| Carbonate | Mixture carbonate (EC/EMC, DMC & DEC = 35/65) | 30.5 |
| Carbonate | Fluoroethylene carbonate (FEC) | 29.3 |
| Non-carbonate | γ-butyrolactone (GBL) | 1.0 |
| Non-carbonate | Phenyl acetate (PA) | 10.2 |
| Non-carbonate | Methyl benzoate (MB) | 6.7 |

Additionally, a salt may be added to the electrolyte. More specifically, a salt preferably comprising lithium is added to the electrolyte to facilitate transfer of electrical charge between the positive and negative electrodes. The lithium salt is a critical component that enhances transfer of lithium ions between electrodes. In a preferred embodiment, the salt may comprise $LiBF_4$, $LiPF_6$, lithium bis(perfluoromethyl sulfonyl)imide (LiTFSI), lithium bis(perfluoroethyl sulfonyl)imide (LiBETI), $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof. Furthermore, at least one of these salts may be added to the electrolyte in concentrations ranging from about 0.25M to about 1.5M. In a preferred embodiment, at least one of salts may comprise from about 5 wt. % to about 18 wt. % of the electrolyte.

Table II below illustrates the affect of adding a lithium salt to various carbonated solvents. Specifically, Table II details the results of various differential scanning calorimetry (DSC) test scans in which each of the samples was heated to 400° C. The table details the measured temperature range, maximum measured temperature and the total measured exothermic heat given off. The amount of gas evolved as a function of wt. % of the solvent sample is also given.

As shown in Table II, the addition of a lithium salt greatly increases the amount of gas that is evolved from the carbonate solvent. On average, the addition of a lithium salt resulted in evolution of about 75 wt. % of the solvent as gas. It is believed that the lithium salt acts as a catalysis that increases decomposition of the carbonated solvents, particularly at elevated temperature.

TABLE II

| | Measured DSC Exothermic Heat | | | Gas |
|---|---|---|---|---|
| | Temp ° C. | Max Temp ° C. | Total heat (J/g) | Evolved (wt %) |
| EC/EMC, DMC & DEC (35/65) w/o lithium salt | 247-386 | 256 | 34 | 30.5 |
| 1M-LiPF$_6$ in EC/EMC, DMC & DEC (35/65) | 251-380 | 291 | 420 | 81.70 |
| 0.8M-LiBF$_4$ in EC/EMC, DMC & DEC (35/65) | 189-373 | 321 | 187 | 74.2 |
| 0.5M-LiN(CF$_3$SO$_2$)$_2$ [LiTFSI] in EC/EMC, DMC & DEC (35/65) | 275-391 | 349 | 103 | 72.6 |
| 0.5M-LiN(C$_2$F$_5$SO$_2$)$_2$ [LiBETI] in EC/EMC, DMC & DEC (35/65) | 239-400 | 387 | 135 | 74.1 |
| 0.8M-LiBOB in EC/EMC, DMC & DEC (35/65) | 189-398 | 337 | 222 | 71.4 |

In comparison, as shown in Table III, the addition of a lithium salt to non-carbonate solvents did not result in gas evolution to the same degree as the carbonated solvents when heated to 400° C. On average, the amount of gas evolved from the non-carbonate solvent samples was about 40 wt. % of the solvents. In particular, the addition of 0.8M LiPF$_6$ to a mixture of 80 wt. % GBL and 20 wt. % FT resulted in no measurable exothermic heat. Furthermore, only about 12 wt. % of the solvent solution evolved into gas when exposed to an elevated temperature of about 400° C.

TABLE III

| | Measured DSC Exothermic Heat | | | Gas |
|---|---|---|---|---|
| | Temp ° C. | Max Temp ° C. | Total heat (J/g) | Evolved (wt %) |
| 0.8M-LiPF$_6$ in GBL:TCE (21:79, 3% FEC) | 233-377 | 338 | 1156 | 50.5 |

TABLE III-continued

| | Measured DSC Exothermic Heat | | | Gas |
|---|---|---|---|---|
| | Temp ° C. | Max Temp ° C. | Total heat (J/g) | Evolved (wt %) |
| 0.8M-LiPF$_6$ in GBL:FT (80:20, 3 wt % FEC) | — | — | 0 | 12.2 |
| 0.8M-LiPF$_6$ in GBL:DCB (80:20, 3 wt % FEC) | 138-400 | 380 | 107 | 48.6 |
| 0.8M-LiBF$_4$ in GBL:FT (80:20, 3 wt % FEC) | 249-400 | 384 | 60 | 23.4 |
| 0.8M-LiBF$_4$ in GBL:DCB (80:20, 3 wt % FEC) | 148-400 | 381 | 262 | 63.1 |

Furthermore, the electrolyte of the present invention may comprise an electrolyte additive. Such electrolyte additives may comprise vinylene carbonate (VC), fluorinated ethylene carbonate (FEC), poly(vinyl pyridine polyvinyl pyridine-co-styrene additives are designed to improve retention of the initial charge with increasing number of discharge/charge cycles. In a preferred embodiment, the electrolyte additive may comprise from about 0.1 to about 6 wt % of the electrolyte. A most preferred electrolyte consists essentially of γ-butyrolactone as a primary solvent, fluorotoluene as a secondary solvent, and an electrolyte additive formulation of vinylene carbonate (0.5 to 5.0 wt %), fluorinated ethylene carbonate (0.5 to 5.0 wt %), and polyvinyl pyridine-co-styrene (0.25 to 2.0 wt %). An alkali metal salt is added to the solvent admixture.

Figure 2:
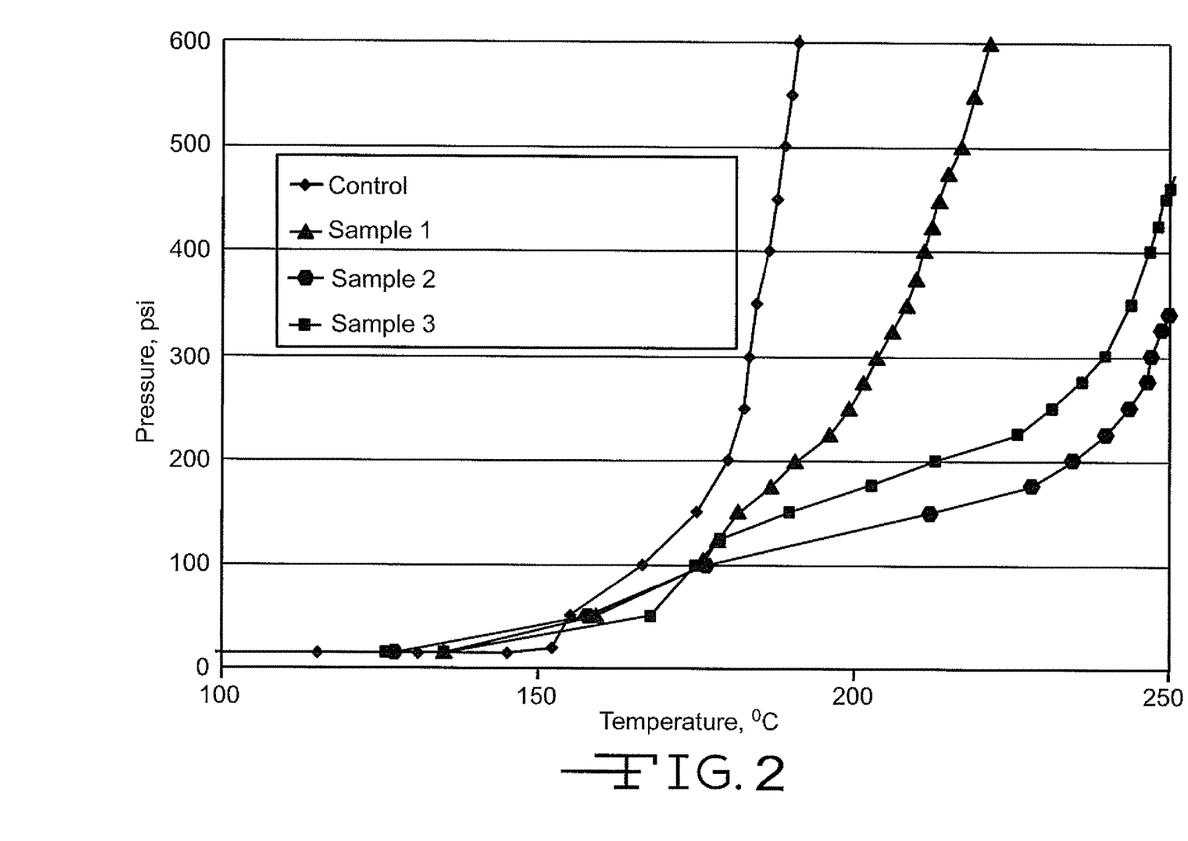
FIG. 2 is a graph illustrating pressure as a function of temperature within a test vessel resulting from the outgassing of various electrolyte formulations.

FIG. 2 graphically illustrates the gas that evolved from various samples of carbonated and non-carbonated electrolytes as a function of applied heat. More specifically, the graph illustrates the amount of pressure, in pounds per square inch (PSI), which built up within a sealed test container as it was heated to about 250° C. The control electrolyte consisted of 0.8M LiBF$_4$ in a mixture of carbonate solvents, namely, ethylene carbonate (EC), ethyl methyl carbonate (EMC), dimethyl carbonate (DMC), diethyl carbonate (DEC). "Sample 1" comprised a mixture of 0.8M LiBF$_4$ in a mixture of ethylene carbonate (EC) and γ-butyrolactone (GBL) in a 33 to 67 wt. % ratio. "Sample 2" comprised 0.8M LiBF$_4$ in γ-butyrolactone (GBL) and "sample 3" comprised a solution of 1M LiBF$_4$ in an 80/20 wt. % ratio mixture of γ-butyrolactone (GBL) and fluorotoluene (FT).

As the graph shows, the control sample comprising the carbonated solvents evolved the most gas at the lowest temperature. The test vessel comprising the control sample reached a pressure of 600 PSI by about 210° C. The test vessel comprising sample 1 also reached a maximum recorded pressure of at least 600 PSI by about 180° C. On the other hand, test vessels comprising the non-carbonated solutions of samples 2 and 3, respectively, did not reach 600 PSI. In particular, sample 2 reached about 350 PSI at about 250° C. and sample 3 reached about 480 PSI at about 250° C.

Based on these results, a number of test cells were constructed, some comprising the carbonated electrolyte of the prior art while others comprised the non-carbonated electrolytes of the present invention. Table IV below details the composition of the various cells that were constructed and tested.

TABLE IV

| Test cell | Anode active material | Cathode active material | Salt | Non-aqueous solvent |
|---|---|---|---|---|
| Control | Graphite | LiCoO$_2$ | 1M-LiPF$_6$ | A mixture of carbonates (EC/EMC, DMC/DEC) (35/65) |
| A | | | 0.8M-LiPF$_6$ | GBL and FT (80/20) VC, FEC, PVPS |
| B | | | 0.8M-LiBF$_4$ | GBL and FT (80/20) VC, FEC, PVPS |

Figure 3:
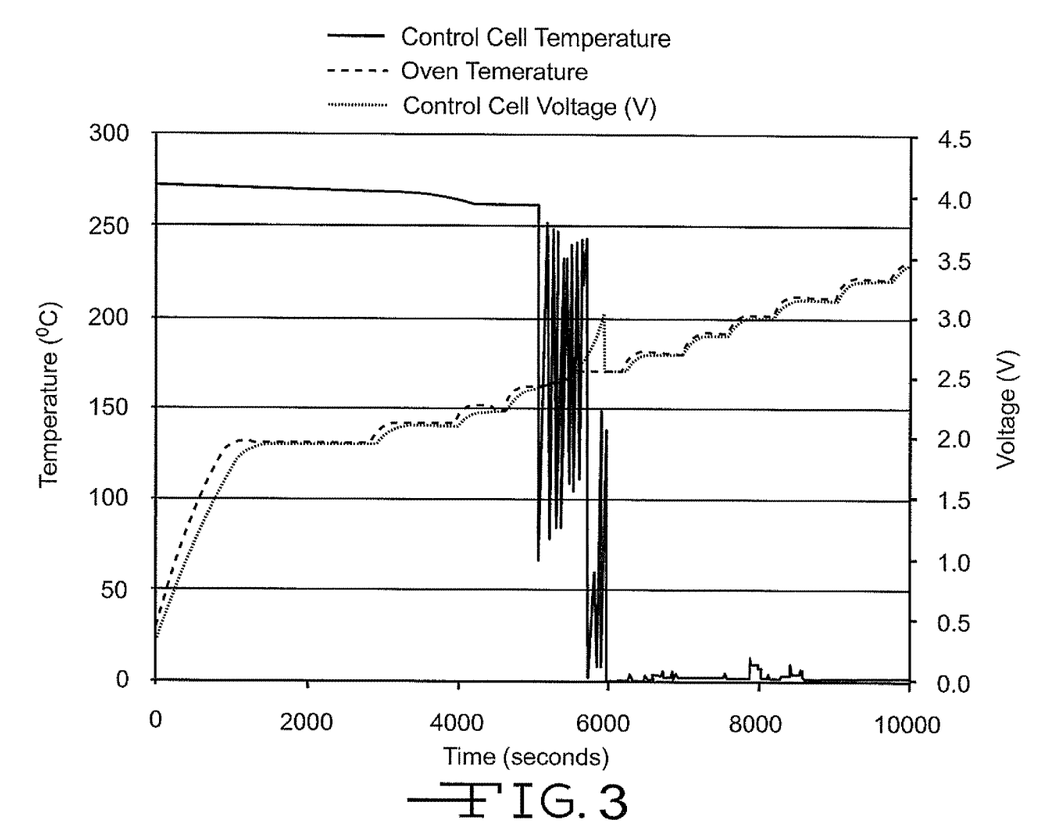
FIG. 3 is a graph showing cell temperature and output voltage as a function of time for the control cell.

FIG. 3 graphically illustrates the voltage output of the control rechargeable electrochemical cell listed in Table IV as a function of increasing temperature. At time 0 and a temperature of about 25° C., the control cell had a voltage output of about 4.1V. As the temperature increased, the control cell maintained a voltage output of about 4V until about 160° C. When the control cell reached about 160° C., as demonstrated by the erratic voltage output reading at about 5,000 seconds, its casing ruptured.

Figure 4:
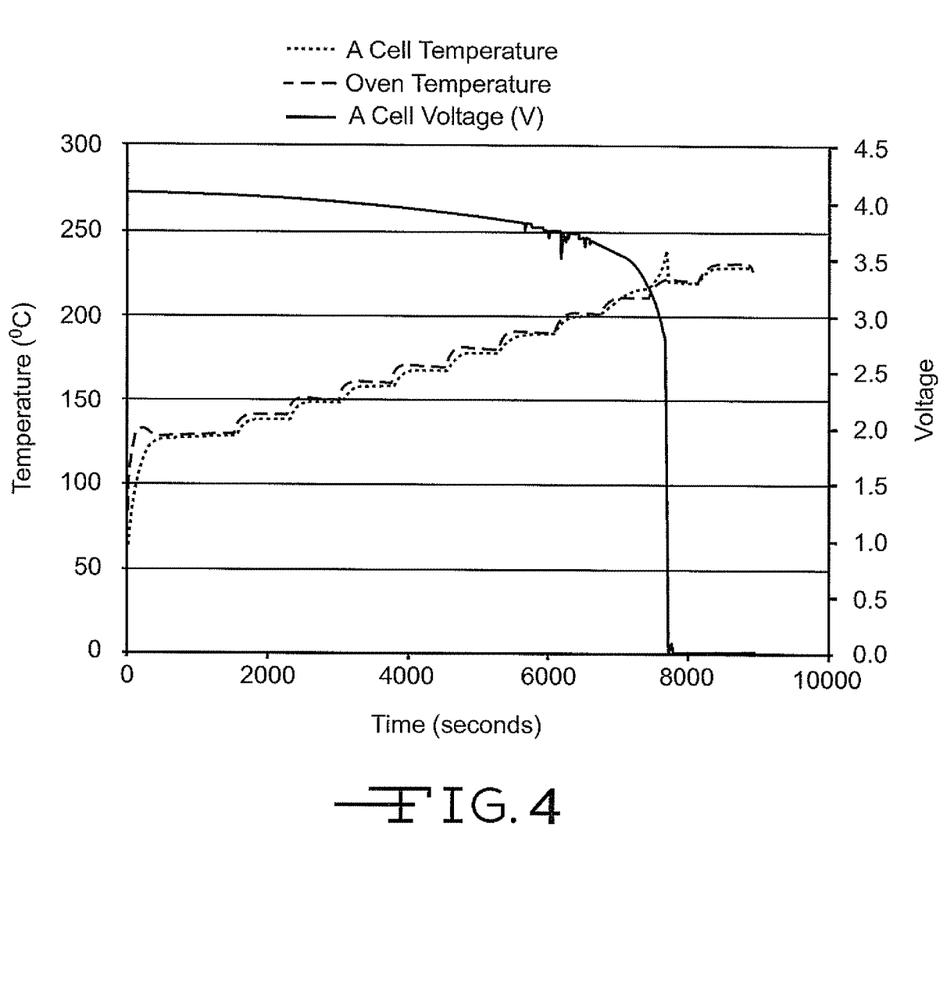
FIG. 4 is a graph illustrating cell temperature and output voltage as a function of time for test cell "A".

FIG. 4 graphically illustrates the voltage output of rechargeable electrochemical cell "A" listed in Table IV as a function of increasing temperature. The electrolyte consisted essentially of 0.8M LiPF$_6$ in a 50/50 wt. % solvent mixture of GBL and FT along with an electrolyte additive formulation of vinylene carbonate, fluorinated ethylene carbonate, and polyvinyl pyridine-co-styrene. At time 0 and a temperature of about 60° C., test cell "A" had a voltage output of about 4.1V. Test cell "A" maintained a voltage output ranging from about 4V to about 3.5V until about 225° C. When test cell "A" reached about 225° C., as demonstrated by the drop off in voltage output, its casing ruptured. In comparison to the control test cell comprising the carbonated electrolyte solvents, test cell "A" was able to generate a usable voltage until about 225° C., a 65° C. increase. In other words, test cell "A", comprising the non-carbonated electrolyte, achieved about a 40% increase in operating temperature over the rechargeable cell of the prior art.

Figure 5:
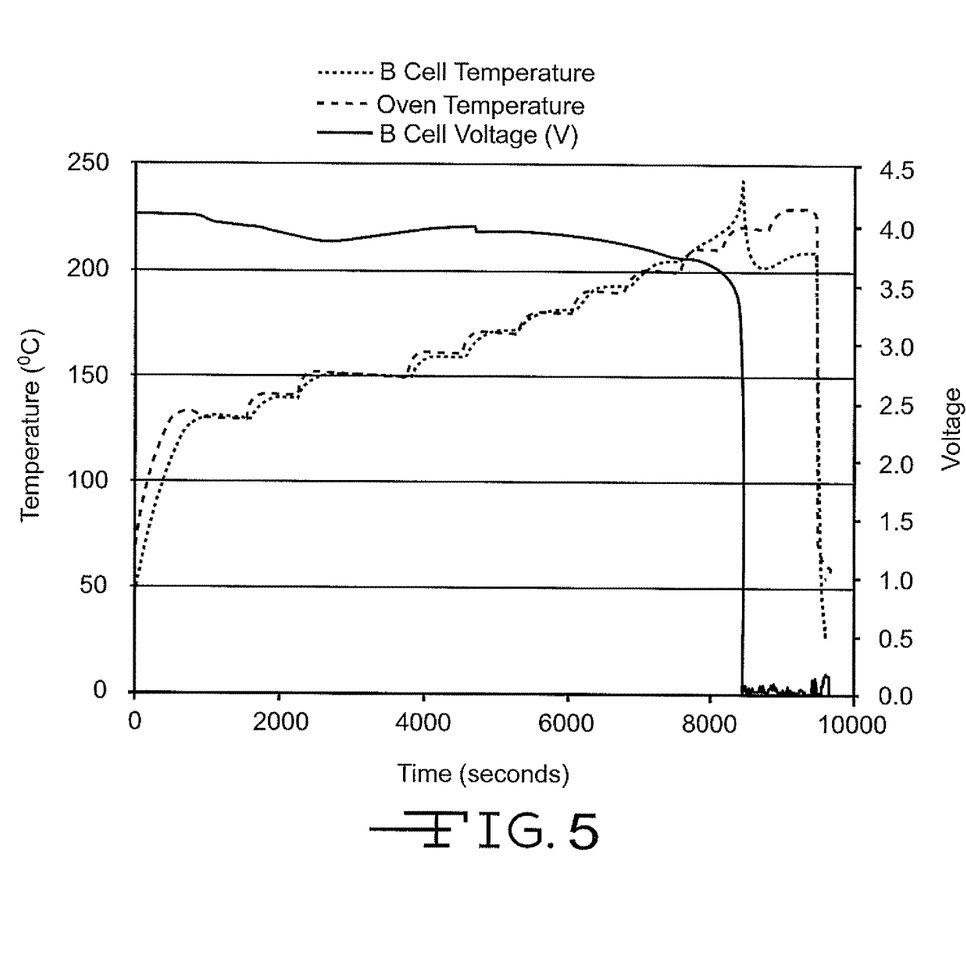
FIG. 5 is a graph illustrating cell temperature and output voltage as a function of time for test cell "B".

FIG. 5 graphically illustrates the test results as a function of increasing temperature of rechargeable electrochemical cell "B" listed in Table IV as a function of increasing temperature. The electrolyte consisted essentially of 0.8M LiBF$_4$ in a 80/20 wt. % solvent mixture of GBL and FT along with an electrolyte additive formulation of vinylene carbonate, fluorinated ethylene carbonate, and polyvinyl pyridine-co-styrene. Similar to FIGS. 3 and 4, this graph illustrates the voltage output of test cell "B" as a function of increasing temperature. At time 0 and a temperature of about 50° C., test cell "B" had a voltage output of about 4.1V. Test cell "B" maintained a voltage output ranging from about 4V to about 3.5V until about 225° C. At that temperature, as demonstrated by the drop off in voltage output, test cell "B" ruptured. In comparison to the control test cell comprising the carbonated electrolyte solvents, however, test cell "B" was also able to generate a usable operating voltage until about 225° C., a 65° C. increase. In other words, test cell "B" comprising the non-carbonated electrolyte of γ-butyrolactone as a primary solvent, fluorotoluene as a secondary solvent, an electrolyte additive formulation of vinylene carbonate, fluorinated ethylene carbonate, and polyvinyl pyridine-co-styrene, and LiBF$_4$ achieved about a 40% increase in operating temperature over the rechargeable cell of the prior art.

Figure 6:
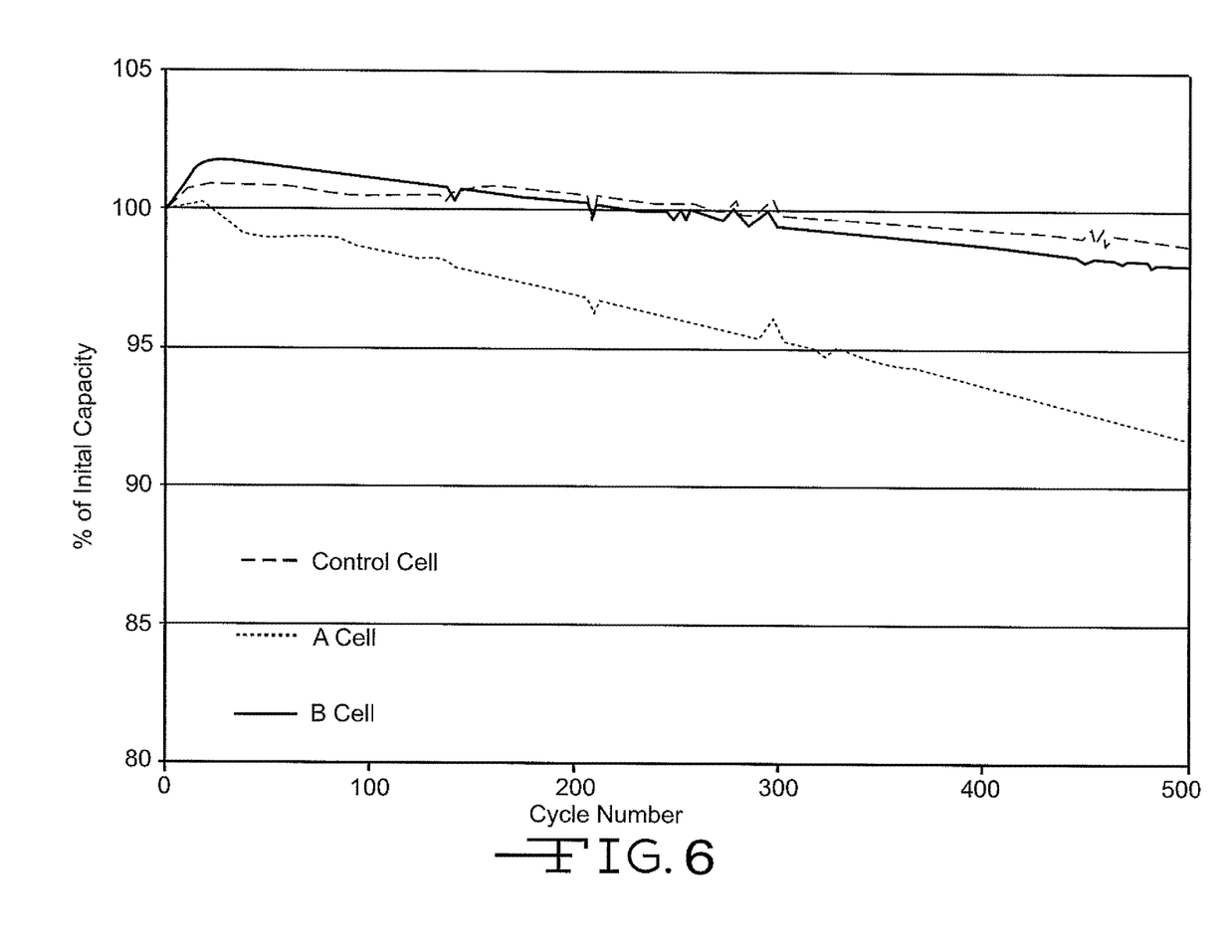
FIG. 6 is a graph showing percentage of the initial discharge capacity as a function of cycles for the control cell, test cell "A" and test cell "B".

FIG. 6 illustrates the results from multiple charge and discharge cycle tests. During the test, the control cell and rechargeable test cells "A", and "B" were repeatedly charged and discharged and their respective discharge capacities were measured and compared. Specifically, the cells were charged at C/2, a rate of half their capacity, to about 4.1V with a cut-off current of C/20 and then discharged at C/2, a rate of half their capacity, to about 2.75V. The process of charging and discharging the cells was repeated 500 times. During each discharge/recharge cycle, the capacity of each cell was measured and compared to their initial capacity. As shown in FIG. 6, after 500 discharge and recharge cycles, the control cell maintained about 98% of its initial discharge capacity.

In comparison, test cell "B" comprising an electrolyte of 0.8M LiBF$_4$ in an 80/20 wt. % solvent mixture of GBL and FT with additives (3 wt. % fluoro ethylene carbonate, 1 wt. % vinylene carbonate and 0.5 wt. % polyvinyl pyridine-co-styrene had a similar cycle performance compared to the control cell containing LiPF$_6$ in of carbonate solvent mixture of EC, EMC, DMC and DEC. After a number of charge/discharge cycles, test cell "B" maintained a majority of its initial discharge capacity. In particular, after 500 cycles, test cell "B" maintained about 97% of its initial discharge capacity.

Test cell "A" comprising an electrolyte of 0.8M LiPF$_6$ in an 80/20 wt. % solvent mixture of GBL and FT with additives (3 wt. % fluoro ethylene carbonate, 1 wt. % vinylene carbonate and 0.5 wt. % polyvinyl pyridine-co-styrene maintained about 93% of its initial discharge capacity after 500 charge/discharge cycles. Accordingly, both test cells "A" and "B" exhibited adequate initial capacity retention, even after 500 charge/discharge cycles. This is adequate for most applications requiring a rechargeable lithium ion cell of the described chemistries, which typically specify from 300 to 500 cycles. Moreover, it is believed that the improved initial capacity retention of test cells "A" and "B" having the solvent formulation γ-butyrolactone as a primary solvent, fluorotoluene as a secondary solvent, an electrolyte additive formulation consisting essentially of vinylene carbonate, fluorinated ethylene carbonate, and polyvinyl pyridine-co-styrene, and the respective LiPF$_6$ and LiBF$_4$ salts would exhibit similar initial capacity retention results if the salt were replaced by any one of the other lithium salts listed above.

As shown in FIG. 1, the assembly of the cell described herein is preferably in the form of a wound element cell. That is, the fabricated cathode 14, anode 12 and separator 24 are wound together in a "jellyroll" type configuration or "wound element cell stack" such that the anode is on the outside of the roll to make electrical contact with the cell case (not shown) in a case-negative configuration. Using suitable top and bottom insulators, the wound cell stack is inserted into a metallic case of a suitable size dimension. The metallic case may comprise materials such as stainless steel, such as 304 stainless steel, 316 stainless steel, mild steel, nickel-plated mild steel, titanium or aluminum, titanium and aluminum alloys such as Ti-6Al-4V and combinations thereof. In a preferred embodiment, the metallic case may comprise an electrical resistivity of at least $1.0 \times 10^{16}$ ohm-m. In addition the casing may comprise two layers comprising an inner case and an outer case layer.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23 or FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte comprising at least one of the solvents described hereinabove and hermetically sealed such as by close-welding a stainless steel ball over the fill hole, but not limited thereto.

The above assembly describes a case-negative cell, which is the preferred construction of the exemplary cell of the present invention. As is well known to those skilled in the art, the exemplary electrochemical system of the present invention can also be constructed in a case-positive configuration.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
   a) a negative electrode comprising a negative electrode active material which intercalates with an alkali metal;
   b) a positive electrode comprising a positive electrode active material which intercalates with the alkali metal;
   c) a separator disposed between the negative and positive electrodes to prevent them from direct physical contact with each other; and
   d) a non-aqueous electrolyte activating the negative and positive electrodes, wherein the electrolyte consists essentially of:
      i) γ-butyrolactone as a primary solvent;
      ii) fluorotoluene as a secondary solvent;
      iii) vinylene carbonate, fluorinated ethylene carbonate, and polyvinyl pyridine-co-styrene as an electrolyte additive formulation; and
      iv) an alkali metal salt.

2. The electrochemical cell of claim 1, wherein γ-butyrolactone is present at from about 70 wt. % to about 97 wt. % of the electrolyte.

3. The electrochemical cell of claim 1, wherein fluorotoluene is present at from about 3 to about 30 wt. % of the electrolyte.

4. The electrochemical cell of claim 1, wherein the electrolyte additive formulation is present at from about 1.25 wt. % to about 12 wt %.

5. The electrochemical cell of claim 1, wherein the vinylene carbonate is present at from about 0.5 wt. % to 5.0 wt. %, the fluorinated ethylene carbonate is present at from about 0.5 wt. % to 5.0 wt. %, and polyvinyl pyridine-co-styrene is present at from about 0.25 wt. % to 2.0 wt. %.

6. The electrochemical cell of claim 1, wherein the alkali metal salt is selected from the group consisting of $LiBF_4$, $LiPF_6$, lithium bis(perfluoromethyl sulfonyl)imide, lithium bis(perfluoroethyl sulfonyl)imide, $LiAsF_6$, $LiSbF_6$, $LiClO_4$, $LiAlCl_4$, $LiGaCl_4$, $LiNO_3$, $LiC(SO_2CF_3)_3$, $LiN(SO_2 CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

7. The electrochemical cell of claim 6, wherein the alkali metal salt has a concentration from about 0.25M to about 1.5M in the electrolyte.

8. The electrochemical cell of claim 6, wherein the alkali metal salt comprises from about 5 wt. % to about 18 wt. % of the electrolyte.

9. The electrochemical cell of claim 1, wherein the alkali metal is lithium.

10. The electrochemical cell of claim 1, wherein the negative electrode active material is selected from the group consisting of coke, carbon black, graphite, acetylene black, carbon fibers, glassy carbon, silicone, tin, $Li_4Ti_5O_{12}$, lithium titanium oxides, and mixtures thereof.

11. The electrochemical cell of claim 1, wherein the negative electrode active material is mixed with a fluoro-resin binder.

12. The electrochemical cell of claim 1, wherein the positive electrode active material of the positive electrode is selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

13. The electrochemical cell of claim 12, wherein the positive electrode active material is mixed with a fluoro-resin binder.

14. The electrochemical cell of claim 12, wherein the positive electrode active material is mixed with a conductive addition selected from the group consisting of acetylene black, carbon black, graphite, nickel powder, aluminum powder, titanium powder, stainless steel powder, and mixtures thereof.

15. The electrochemical cell of claim 1, wherein the positive electrode active material is selected from the group consisting of $LiNiO_2$, $LiMn_2O_4$, $Li_4Ti_5O_{12}$, $LiCoO_2$, $LiCo_{0.92}Sn_{0.08}O_2$, $LiNi_6Co_2Mn_2O_2$, lithium nickel cobalt aluminum oxide, and lithium cobalt nickel oxide.

16. The electrochemical cell of claim 1, wherein an amount of out-gas from the electrolyte is less than about 25 wt. % of the electrolyte when heated to at least about 100° C.

17. An electrochemical cell, comprising:
    a) a negative electrode comprising a negative electrode active material which intercalates with lithium;
    b) a positive electrode comprising a positive electrode active material which intercalates with lithium;
    c) a separator disposed between the negative and positive electrodes to prevent them from direct physical contact with each other; and
    d) a non-aqueous electrolyte activating the negative and positive electrodes, wherein the electrolyte comprises:
       i) γ-butyrolactone as a primary solvent;
       ii) fluorotoluene as a secondary solvent;
       iii) vinylene carbonate, fluorinated ethylene carbonate, and polyvinyl pyridine-co-styrene as an electrolyte additive formulation; and
       iv) an alkali metal salt.

18. The electrochemical cell of claim 17, wherein in the electrolyte, γ-butyrolactone is present at from about 70 to about 97 wt. %, fluorotoluene is present at from about 3 to about 30 wt. %, and the electrolyte additive formulation is present at from about 1.25 wt. % to about 12 wt. %.

19. An electrolyte for an electrochemical cell, the electrolyte consisting essentially of:
    a) γ-butyrolactone as a primary solvent;
    b) fluorotoluene as a secondary solvent;
    c) vinylene carbonate, fluorinated ethylene carbonate, and polyvinyl pyridine-co-styrene as an electrolyte additive formulation; and
    d) an alkali metal salt, e) wherein in the electrolyte, γ-butyrolactone is present at from about 65 wt. % to about 75 wt. %, fluorotoluene is present at from about 10 to about 30 wt. %, vinylene carbonate is present at from about 0.5 wt. % to 5.0 wt. %, fluorinated ethylene carbonate is present at from about 0.5 wt. % to 5.0 wt. %, polyvinyl pyridine-co-styrene is present at from about 0.25 wt. % to 2.0 wt. %, and the alkali metal salt comprises from about 5 wt. % to about 10 wt. %.

20. The electrolyte of claim 19, wherein the alkali metal salt is selected from the group consisting of $LiBF_4$, $LiPF_6$, lithium bis(perfluoromethyl sulfonyl)imide, lithium bis(perfluoroethyl sulfonyl)imide, $LiAsF_6$, $LiSbF_6$, $LiClO_4$, $LiAlCl_4$, $LiGaCl_4$, $LiNO_3$, $LiC(SO_2CF_3)_3$, $LiN(SO_2 CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

21. The electrolyte of claim 19, wherein the alkali metal salt is present at from about 5 wt. % to about 10 wt. % of the electrolyte.

22. A method for providing an electrochemical cell, comprising the steps of:
    a) providing a negative electrode comprising a carbonaceous negative electrode active material which intercalates with lithium;
    b) providing a positive electrode comprising a positive electrode active material which intercalates with lithium;
    c) disposing a separator between the negative and positive electrodes to prevent them from direct physical contact with each other; and
    d) activating the positive and negative electrodes with a non-aqueous electrolyte, the electrolyte consisting essentially of:
        i) γ-butyrolactone provided as a primary solvent;
        ii) mixing fluorotoluene as a secondary solvent;
        iii) providing vinylene carbonate, fluorinated ethylene carbonate, and polyvinyl pyridine-co-styrene as an electrolyte additive formulation; and
        iv) dissolving an alkali metal salt therein,
        v) wherein in the electrolyte, γ-butyrolactone is present at from about 70 to about 97 wt. %, fluorotoluene is present at from about 3 to about 30 wt. %, and the electrolyte additive is present at from about 1.25 wt. % to about 12 wt. %.

23. The method of claim 22, including providing the primary solvent of γ-butyrolactone at from about 70 wt. % to about 97 wt. %, the secondary solvent of fluorotoluene at from about 3 wt. % to about 30 wt. %, the vinylene carbonate at from about 0.5 wt. % to 5.0 wt. %, the fluorinated ethylene carbonate at from about 0.5 wt. % to 5.0 wt. %, and polyvinyl pyridine-co-styrene at from about 0.25 wt. % to 2.0 wt. % of the electrolyte.

24. The method of claim 22, including selecting the alkali metal salt from the group consisting of $LiBF_4$, $LiPF_6$, lithium bis(perfluoromethyl sulfonyl)imide, lithium bis(perfluoroethyl sulfonyl)imide, $LiAsF_6$, $LiSbF_6$, $LiClO_4$, $LiAlCl_4$, $LiGaCl_4$, $LiNO_3$, $LiC(SO_2CF_3)_3$, $LiN(SO_2 CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

25. The method of claim 22, including providing the alkali metal salt having a concentration from about 0.25M to about 1.5M in the electrolyte.

26. The method of claim 22, including selecting the carbonaceous negative electrode active material from the group consisting of coke, carbon black, graphite, acetylene black, carbon fibers, glassy carbon, and mixtures thereof.

27. The method of claim 22, including selecting the positive electrode active material of the positive electrode from the group consisting of $LiNiO_2$, $LiMn_2O_4$, $Li_4Ti_5O_{12}$, $LiCoO_2$, $LiCo_{0.92}Sn_{0.08}O_2$, $LiNi_6Co_2Mn_2O_2$, lithium nickel cobalt aluminum oxide, and lithium cobalt nickel oxide.

* * * * *